United States Patent [19]

Mochida et al.

[11] Patent Number: 5,205,888
[45] Date of Patent: Apr. 27, 1993

[54] PROCESS FOR PRODUCING CARBON FIBER REINFORCED CARBON MATERIALS

[75] Inventors: Isao Mochida, Fukuoka; Ryuji Fujiura, Niigata, both of Japan

[73] Assignee: Mitsubishi Gas Chemical Company, Inc., Tokyo, Japan

[21] Appl. No.: 724,892

[22] Filed: Jul. 2, 1991

[30] Foreign Application Priority Data

Jul. 3, 1990 [JP] Japan .................................. 2-174548
Nov. 1, 1990 [JP] Japan .................................. 2-293684

[51] Int. Cl.$^5$ ..................... B29C 43/18; C01B 31/04
[52] U.S. Cl. ...................................... 156/89; 156/242;
264/29.5; 264/29.6; 264/29.7; 264/136;
423/447.4; 423/447.7; 423/447.8; 423/448;
427/228; 427/377; 427/379
[58] Field of Search ............... 427/228, 377, 379, 189;
264/29.1, 29.5, 29.6, 29.7, 131, 136, 258;
156/89, 155, 242; 423/447.4, 447.7, 447.8, 448, 449

[56] References Cited

U.S. PATENT DOCUMENTS

| | | | |
|---|---|---|---|
| 4,029,829 | 5/1977 | Weaver et al. | 427/44 |
| 4,490,201 | 12/1984 | Leeds | 156/155 |
| 4,891,126 | 1/1990 | Mochida et al. | 208/39 |
| 5,061,414 | 10/1991 | Engle | 264/29.5 |
| 5,096,519 | 3/1992 | Kawakubo et al. | 156/89 |

FOREIGN PATENT DOCUMENTS 2722575 12/1977 Fed. Rep. of Germany .
58-48485 10/1983 Japan .
62-212263 9/1987 Japan .

Primary Examiner—Leo B. Tentoni
Attorney, Agent, or Firm—Venable, Baetjer Howard & Civiletti

[57] ABSTRACT

A process for making carbon fiber reinforced materials which not only have desirable qualities which include high strength, high heat resistance, chemical resistance, wear resistance and lightweightness but also which are produced in a short time and at low cost. The process includes the steps of impregnating a carbon fiber assembly with a melt of mesophase pitch or mixing short carbon fibers with the mesophase pitch, shaping the pitch-impregnated assembly or the pitch/short carbon fiber mixture, and firing the same. The process requires that the mesophase pitch used in the process be almost 100% of an optical anistropic phase as examined under a polarizing microscope; have a softening point of no higher than 350° C. and be capable of being carbonized in a yield of at least 70% when gradually heated to a temperature of about 600° C. in an inert gas atmosphere and then held at that temperature for two hours.

8 Claims, No Drawings

PROCESS FOR PRODUCING CARBON FIBER REINFORCED CARBON MATERIALS

BACKGROUND OF THE INVENTION

The present invention relates to a process the producing carbon fiber reinforced carbon materials that have not only high strength but also other desirable properties including high heat resistance, chemical resistance, wear resistance and lightweightness.

Carbon fiber reinforced carbon materials are a class of advanced composite materials that are most appealing today because of the excellent capabilities and characteristics they offer. Making use of their high mechanical properties, heat resistance, wear resistance and good thermal and electric conductivity, carbon fiber reinforced carbon materials are increasingly used in many fields including the space industry, electronics industry and nuclear industry. Carbon fiber reinforced carbon materials also have high biocompatibility and hold promise for use as artificial bones, dental roots and joints. Under the circumstances, active R&D efforts are being conducted on that particular class of carbon materials in many countries of the world.

Processes for producing carbon fiber reinforced carbon materials which find such broad use have been described in many patents and patent applications including DE 2722575A1, U.S. Pat. Nos. 4,029,829, and 4,490,201, Japanese Patent Publication No. 48485/1983 and Japanese Patent Public Disclosure No. 212263/1987, to name a few. Processes currently practiced to composite carbon fibers with matrices are chiefly intended to produce high-density carbon fiber reinforced carbon materials and, to this end, two methods are in common use; in one method, fine voids in carbon materials are re-impregnated with a matrix material which is then carbonized, and this procedure is repeated the necessary times (this method is generally referred to as a "resin impregnation/carbonization technique"); in the other method, carbon in vapor phase is deposited in voids (a "CVD" technique).

In the resin impregnation/carbonizing technique, thermosetting resins such as furan resins or phenolic resins, or thermoplastic resins typified by pitch are used as starting carbon materials that provide the matrix of carbon fiber reinforced carbon materials and those matrix resins are carbonized by heat treatment at ca. 1000° C. in an inert gas atmosphere. In this method, an extremely slow temperature elevation is necessary in the temperature range where those resins are melted and carbonized. Further, the yield of resin carbonization is as low as 40–60%. In addition, the evaporation of volatile matters causes void formation in the matrix and this necessitates a cumbersome secondary treatment involving resin multiple impregnation, carbonization and compression.

In the CVD technique, a lower hydrocarbon such as methane or propane is supplied as a matrix material into a CVD apparatus together with an inert gas such as argon and the hydrocarbon feed is decomposed thermally under vacuum at ca. 800°–1500° C. into carbon which is directly deposited on a substrate. Since the pyrolytic carbon is directly deposited in vapor phase on the substrate, the CVD technique is capable of forming a dense and homogeneous matrix but, on the other hand, it is very disadvantageous from the viewpoints of productivity and economy since the equipment cost is high and considerably long process time is necessary.

Because of these disadvantages, the CVD technique is often combined with the resin impregnation/carbonizing process and used in a secondary treatment for densification.

As described above, the process of compositing carbon fibers with matrices is extremely complex and the carbon fiber reinforced carbon materials produced by the conventional methods are very expensive and hence have found only limited commercial use. The commercial value of carbon fiber reinforced carbon materials for use as engineering materials would be greatly enhanced if a method for large-scale production at lower cost were established in the future.

SUMMARY OF THE INVENTION

An object, therefore, of the present invention is to provide a process by which carbon fiber reinforced carbon materials having not only high strength but also other desirable properties including high heat resistance, chemical resistance, wear resistance and lightweightness can be easily produced in a short time and at low cost.

In order to attain the above-stated object, the present inventors conducted intensive studies based on the well known characteristics of mesophase pitch. As a result, they found the following: when mesophase pitch having high flowability and high capability for carbonization was used as a matrix material, the pitch, either in a molten or softening state, readily impregnated into an assembly of carbon fibers or among short carbon fibers to achieve a uniform dispersion. Further, given a slight heat treatment, the mesophase pitch maintained a high level of binding power while achieving a high yield of carbonization and a carbon fiber reinforced carbon material of high performance could be obtained at low cost and in a very simple way without using any binder. The present invention has been accomplished on the basis of these findings.

The present invention relates basically to a process for producing carbon fiber reinforced carbon materials. In one aspect of the invention, the process comprises the steps of impregnating a carbon fiber assembly with a melt of mesophase pitch that has a softening point of no higher than 350° C. and that can be carbonized in a yield of at least 70% when it is gradually heated to a temperature of about 600° C. in an inert gas atmosphere and then held at that temperature for 2 hours, shaping the pitch-impregnated assembly, and firing the same. In another aspect of the invention, the process comprises the steps of mixing short carbon fibers with a mesophase pitch that has a softening point of no higher than 350° C. and that can be carbonized in a yield of at least 70% when it is gradually heated to a temperature of about 600° C. in an inert gas atmosphere and then held at that temperature for 2 hours, shaping the mixture, and firing the same.

DETAILED DESCRIPTION OF THE INVENTION

The carbon fiber assembly to be used in the present invention is formed from various kinds of carbon fibers including PANs and pitch. The carbon fiber assembly may be a web of unidirectional fibers, a two-dimensional woven fabric or a nonwoven fabric sheet. Two or more of these assemblies may be combined. The choice of an appropriate type of carbon fiber assembly depends upon the use of the final product and on the specific characteristics required of it. The carbon fiber assembly as a reinforcement is preferably subjected to a preliminary surface treatment such as oxidation.

The short carbon fibers to be used in the present invention are also formed from various kinds of carbon fibers including PANs and pitch. Not only carbonized fibers but also graphitized fibers can be used. The fiber length is variable from 50 µm to 10 mm depending on the use of the final product and on the specific characteristics required of it. The short carbon fibers as reinforcements are also preferably subjected to a preliminary surface treatment such as oxidation.

The mesophase pitch to be used as a matrix desirably contains at least 80%, preferably at least 90%, more preferably almost 100%, of an optical anisotropic phase as examined under a polarizing microscope. The mesophase pitch must be capable of impregnating the carbon fiber assembly or short carbon fibers. The efficiency of pitch impregnation depends on various factors such as the shape of the carbon fiber assembly or short carbon fibers. Generally, the lower its softening point, the greater the ability of the mesophase pitch to impregnate. The mesophase pitch to be used in the present invention has a softening point of no higher than 350° C., preferably not higher than 300° C. The temperature at which the viscosity of the mesophase pitch is 80 poises should be not higher than 400° C. The softening point of the mesophase pitch is measured with a differential scanning calorimeter and its viscosity is measured with a flow tester. If mesophase pitch having a softening point higher than 350° C. and whose temperature at which a viscosity of 80 poises is reached is higher than 400° C. is used, low fluidity and the resulting decrease in the efficiency of impregnation makes it impossible to produce a dense and homogeneous matrix and, hence, a carbon material having high strength cannot be obtained.

Another requirement that should be met by the mesophase pitch for use in the present invention is that it achieve a carbonization yield of at least 70%, preferably at least 80%, when it is gradually heated to a temperature of about 600° C. in an inert gas stream and thereafter held at that temperature for about 2 hours. The use of this mesophase pitch having high carbonization yield contributes to less evaporation of volatile matter during carbonization and, hence, the carbon bonds formed are dense and leave practically no voids behind, thereby leading to the formation of an extremely rugged optical anisotropic phase. On the other hand, if pitch having low carbonization yield is used, voids are more likely to form in the shaped product on account of evaporating gases and the carbon fiber reinforced carbon material obtained as the final product will have an insufficient mechanical strength.

An advantageous example of the mesophase pitch that satisfies the above-described conditions is the mesophase pitch described in U.S. Pat. No. 4,891,126. This is the pitch obtained by polymerizing condensed polycyclic aromatic hydrocarbons in the presence of HF-BF$_3$ and it achieves high carbonization yield, has low softening point and exhibits good flowability at 200°-350° C.

When the carbon fiber assembly is used as a reinforcement, the mesophase pitch described above is melted by heating to a temperature higher than its softening point, say, a temperature between 200° and 390° C., and the molten pitch is impregnated in the carbon fiber assembly. For proper adjustment of the amount of impregnation, excess pitch may optionally be squeezed after the step of impregnation.

The thus pitch-impregnated carbon fiber assembly is then subjected to a preliminary heat treatment to form a prepreg. For this preliminary heat treatment, an appropriate heating condition must be selected in such a way that the mesophase pitch impregnating between fibers will not be totally carbonized nor lose its binding property. The specific condition for the preliminary heat treatment will vary with factors such as the properties of mesophase pitch and the degree of its impregnation but in a typical case the pitch-impregnated carbon fiber assembly is heated in a non-oxidizing atmosphere to a temperature of about 350°-490° C. within a short time at a rate of 2°-10° C./min. This condition of preliminary heat treatment contributes to a further improvement in the yield of carbonization. There is no particular limitation on the pressure that can be used in the preliminary heat treatment and it may be either atmospheric, superatmospheric or subatmospheric.

If the preliminary heat treatment is insufficient, the chance of the occurrence of expansion or foaming will increase in the subsequent lamination/carbonization step on account of evaporating gases and it is impossible to obtain a high-performance carbon material. In fact, however, these problems can be minimized by performing oxidation with a small amount of air that is blown into the preliminary heating atmosphere in the middle of the preliminary heat treatment or immediately before the end of that treatment. Any slight expansion that will occur during the preliminary heat treatment can be eliminated by compressing prepregs either between rolls or under a press during said preliminary heat treatment, with the result that the prepregs can be densified without losing its binding property.

If the preliminary heat treatment is excessive, the binding property of the prepregs will decrease to increase the chance of delamination in subsequent stages and it sometimes becomes impossible to obtain a carbon fiber reinforced carbon material having a desired strength. In short, by performing the preliminary heat treatment to an appropriate extent, the binding property of the mesophase pitch is retained and yet the gases that will evolve in the carbonizing step can be eliminated as much as possible, with the result that a carbon fiber reinforced carbon material of high density and strength can be obtained by a single run of firing.

In the next step, a plurality of the prepared prepregs are laminated and pressed together. In this step, there is no particular need to use a binder. The shape of the laminate is not limited in any particular way and it may be a plate, cylinder or any other shape depending on the object or use of the final product or the performance required of it. The laminate has to be pressed in a pressure range that will neither destroy the structure of carbon fibers as the reinforcement nor deprive the carbon fibers of their inherent strength. Carbon materials of satisfactorily high strength can be obtained even if the pressing step is conducted at ordinary temperatures in a non-oxidizing atmosphere but further improvements in fiber strength can be achieved by raising the temperature to be within the range of about 300°-600° C.

A desired carbon fiber reinforced carbon material can be obtained by subsequently firing the pressed laminate. The firing step is conducted by charring the laminate at an elevated temperature of about 600°-1500° C. in a non-oxidizing atmosphere. If desired, the charred product may be graphitized by further heating to a temperature in the range of about 2000°–3000° C.

If short carbon fibers are to be used as a reinforcement, they are mixed with the mesophase pitch in a fiber to pitch weight ratio of 30/70–90/10, preferably 40/60–70/30. In this instance, fine particulate carbon aggregates such as carbon black, coke powder and graphite may be optionally added to the mixture in amounts of 3–70% of the mosophase pitch. These fine particulate carbon aggregates have sizes of no more than 10 μm, preferably no more than 1 μm. The addition of those fine particulate carbon aggregates will further contribute to the densification of the shaped product, thereby improving its mechanical strength.

The method of mixing the short carbon fibers with the mesophase pitch and with the fine particulate carbon aggregates, if they are added at all, is not limited in any particular way as long as those components are uniformly mixed.

In the next step, the mixture is subjected to a coating step. In the coating step, the mixture is heated until the mesophase pitch melts or softens, whereby the surfaces of the short carbon fibers and/or fine particulate carbon aggregates are covered with the pitch uniformly and rapidly to have the pitch dispersed uniformly among the short carbon fibers. To this end, agitation or kneading is performed as required during the melting or softening of the pitch. In practice, the coating step is usually performed in the process of temperature elevation as a part of the subsequent preliminary heat treatment (Examples 7, 9, 11 and 13).

Subsequently, the mixture having the mesophase pitch dispersed uniformly among the short carbon fibers is subjected to a preliminary heat treatment for further enhancing the performance of the final product. For this preliminary heat treatment, an appropriate heating condition must be selected in such a way that the mesophase pitch will not be totally carbonized nor lose its binding property. The specific condition for the preliminary heat treatment will vary with factors such as the properties of mesophase pitch and the ratio at which it is mixed with the short carbon fibers, but in a typical case the mixture is heated in a non-oxidizing atmosphere to a temperature of about 300°–490° C. at a rate of 1°–20° C./min and held at that temperature for a short time of 1–60 minutes. This condition of preliminary heat treatment contributes to a further improvement in the yield of carbonization. There is no particular limitation on the pressure that can be used in the preliminary heat treatment and it may be either atmospheric, superatmospheric or subatmospheric.

If the preliminary heat treatment is insufficient, the chance of the occurrence of expansion or foaming will increase in the subsequent firing step on account of evaporating gases and it is impossible to obtain carbon fiber reinforced carbon material of high quality. On the other hand, excessive preliminary heat treatment can reduce the binding property of the mesophase pitch, occasionally causing its failure to develop the desired mechanical performance. In short, by performing the preliminary heat treatment to an appropriate extent, the binding property of the mesophase pitch is retained and yet the gases that will evolve in the firing step can be eliminated as much as possible, with the result that a carbon fiber reinforced carbon material of high density and strength can be obtained by a single run of firing.

In practice, however, expansion or foaming becomes less likely to occur in the firing step as the pitch content of the mixture of mesophase pitch and short carbon fibers decreases, so it is not absolutely necessary to perform the preliminary heat treatment after the coating operation if the pitch content of the mixture is small (see Example 15). Needless to say, the volatile matter can be removed by performing the preliminary heat treatment after the coating operation and this contributes to further enhancement in densification. The pitch content which obviates the need of preliminary heat treatment depends on various factors including the properties of the mesophase pitch, the conditions of shaping and charring, and the characteristics required of the final product. According to the results of experiments conducted by the present inventors, the pitch content at issue was approximately 30%.

In the next step, the mixture which is a uniform dispersion of mesophase pitch retaining high binding property is shaped and fired. Since the mixture is in the form of lumps, it is optionally pulverized into particles so as to facilitate the subsequent shaping step. The shape to be achieved can be freely selected depending upon factors such as the object or use of the final product. The shaping step may be performed either at ambient temperature or at a temperature where the mesophase pitch softens or melts and which case should be selected depends upon the shape or performance required of the final product. The shaping pressure must be within such a range that the structure of reinforcement short carbon fibers will not be destroyed nor will they lose their inherent strength.

The shaped mixture is then fired to obtain the intended carbon fiber reinforced carbon material. The firing of the shaped mixture is generally performed by heating it in the charring temperature range of about 600°–1500° C. in a non-oxidizing atmosphere. If desired, the charred shaped mixture may be graphitized by heating at a temperature of about 2000°–3000° C.

In the method of the present invention, mesophase pitch having extremely high capability for carbonization and a low softening point is used as a matrix material and it is uniformly dispersed and subjected to an appropriate heat treatment before shaping. Hence, the subsequent firing of the mesophase pitch can be accomplished within a short time and adequately high density and strength can be attained by a single run of firing. The mesophase pitch powder effectively retains the shape of the formed part and yet it forms a thin layer that is uniformly dispersed within the structure of the shaped part on account of its flowability at 300°–350° C. Hence, by subsequent charring, uniform carbon bonds are formed in the carbon fiber assembly or between short carbon fibers or even between particulate aggregates that are optionally added. Further, the matrix deriving from the mesophase pitch has an optical anisotropic structure, is highly dense and has high purity, so very strong carbon bonds are formed between carbon fibers (aggregates, if they are added) and the matrix. The strength of those carbon bonds is further increased by firing at elevated temperatures since the degree of graphitization in the composite is increased and its densification is further enhanced by subsequent shrinkage. As a further advantage, the mesophase pitch used in the present invention has such a high binding property as to obviate the use of a binder.

For the reasons described above, lightweight and high-strength carbon fiber reinforced carbon materials having desirable properties such as high heat resistance and wear resistance can be manufactured easily in a short time and at low cost by the method of the present invention. Hence, the present invention offers great industrial benefits.

The following examples are provided for the purpose of further illustrating the present invention but are in no way to be taken as limiting.

EXAMPLE 1

A woven fabric of PAN based carbon fibers (TORAYCA CLOTH #6343 of Toray Industries, Inc.) was washed with acetone and thereafter impregnated with mesophase pitch at 300° C. under vacuum. The mesophase pitch was prepared by polymerizing naphthalene in the presence of HF—BF$_3$; it had a softening point of 218° C., had a viscosity of 80 poises at ca. 300° C., and could be carbonized in a yield of 85% upon heating at about 600° C. Excess pitch was squeezed off by passage between hot rollers.

The pitch-impregnated fabric was subjected to a preliminary heat treatment in the following manner: it was heated to 370° C. at a rate of 5° C./min and held at that temperature for 20 minutes.

By repeating these procedures, prepregs with a carbon fiber content of ca. 50 wt % and having a binding property were prepared.

Those prepregs were laminated without using a binder and pressed with a hot press assembly in a nitrogen atmosphere, with the temperature being elevated to 500° C. at a rate of 1° C./min. The maximum pressure achieved was 200 kgf/cm$^2$. Thereafter, the pressure was removed and the temperature was elevated up to 1300° C. at a rate of 1° C./min in an argon atmosphere, whereby a charred disk having a diameter of 60 mm and a thickness of 10 mm was obtained.

EXAMPLE 2

The charred disk obtained in Example 1 was further heated to 2500° C. in an argon atmosphere to have the disk graphitized.

EXAMPLE 3

Prepregs of the same type as used in Example 1 were laminated without using a binder and shaped into a disk (60 mm$^\phi \times$ 10 mm$^T$) at ambient temperature with a pressure of 200 kgf/cm$^2$ being applied. Thereafter, the disk was carbonized by heating up to 1300° C. in an argon atmosphere at atmospheric pressure.

EXAMPLE 4

The carbonized disk obtained in Example 3 was further heated to 2500° C. in an argon atmosphere to have the disk graphitized.

EXAMPLE 5

A commercial nonwoven fabric of carbon fibers (KUREKA PAPER E-20 of Kureha Chemical Industry Co., Ltd.) was used after removing the size. Thereafter, the fabric was impregnated with mesophase pitch at 380° C. at atmospheric pressure. The mesophase pitch was prepared by polymerizing naphthalene in the presence of HF—BF$_3$; it had a softening point of 285° C., had a viscosity of 80 poises at ca. 380° C., and could be carbonized in a yield of 87% upon heating at about 600° C. Excess pitch was squeezed off by passage between hot rolls.

The pitch-impregnated fabric was subjected to a preliminary heat treatment in the following manner: it was heated to 430° C. at a rate of 5° C./min and held at that temperature for 10 minutes.

By repeating these procedures, prepregs with a carbon fiber content of ca. 50wt % and having a binding property were prepared.

Those prepregs were laminated without using a binder, hot pressed at a pressure of 100 kgf/cm$^2$ and at 500° C., and carbonized at 1300° C. and at atmospheric pressure to obtain a charred disk having a diameter of 60 mm and a thickness of 10 mm.

EXAMPLE 6

The charred disk obtained in Example 5 was further heated to 2500° C. in an argon atmosphere to have the disk graphitized.

EXAMPLE 7

Fifty parts of short pitch based carbon fibers (100 μm long) (Xylus GPMF100J, the product of joint development by Kawasaki Steel Corp. and Nitto Boseki Co., Ltd.) was mixed uniformly with 50 parts of a mesophase pitch powder obtained by polymerizing naphthalene in the presence of HF—BF$_3$; the pitch had a softening point of 218° C., could be carbonized in a yield of 85%, and was totally composed of an optical anisotropic phase (100 vol %). The mixture was then heated, under agitation, to a temperature of 300° C. at a rate of 5° C./min so as to form a mesophase pitch coat on the surfaces of carbon fibers. Further, the mixture was subjected to a preliminary heat treatment by heating to 450° C. and holding at that temperature for 30 minutes. The thus prepared shaping sample was characterized as a uniform dispersion of mesophase pitch having a good binding property.

The shaping sample was pressed into a disk at ambient temperature and at a pressure of 1000 kg/cm$^2$. Thereafter, the disk was heated up to 600° C. at a rate of 1° C./min in a nitrogen atmosphere (30 atm) and held at that temperature for 2 hours. Subsequently, the disk was fired at 1300° C. for 2 hours in an argon stream, whereby a charred disk measuring 60 mm in diameter and 10 mm in thickness was obtained.

EXAMPLE 8

The charred disk obtained in Example 7 was further heated to 2500° C. to have the disk graphitized.

EXAMPLE 9

Pitch based carbon fibers (KUREKA CLOTH P-200 of Kureha Chemical Industry Co., Ltd.) were cut to an average length of 400 μm. Fifty five parts of the resulting short fibers were mixed uniformly with 45 parts of a mesophase pitch powder obtained by polymerizing naphthalene in the presence of HF—BF$_3$; the pitch had a softening point of 285° C., could be carbonized in yield of 87%, and was totally composed of an optical anisotropic phase (100 vol%). The mixture was then heated to 360° C. at a rate of 5° C./min so as to form a mesophase pitch coat on the surfaces of carbon fibers. Further, the mixture was subjected to a preliminary heat treatment by heating to 440° C. and holding at that temperature for 10 minutes. The thus prepared shaping sample was characterized as a uniform dispersion of mesophase pitch having a good binding property.

The shaping sample was hot pressed into a disk at a temperature of 480° C. and at a pressure of 1000 kg/cm$^2$. Thereafter, the disk was heated up to 600° C. at a rate of 1° C./min at atmospheric pressure and held at that temperature for 2 hours. Subsequently, the disk was fired at 1300° C. for 2 hours to obtain a charred disk measuring 60 mm in diameter and 10 mm in thickness.

EXAMPLE 10

The charred disk obtained in Example 9 was further heated to 2500° C. to have the disk graphitized.

EXAMPLE 11

Fifty parts of short (100 μm long) pitch based carbon fibers (Xylus GPMF 100J, the product of joint development by Kawasaki Steel Corp. and Nitto Boseki Co., Ltd.) was mixed with 40 parts of the same mesophase pitch powder as used in Example 7. Further, 10 parts of carbon black (#30 of Mitsubishi Kasei Corp.) was added and the ingredients were mixed uniformly. Subsequently, the same procedures were performed as in Example 7 to obtain a charred disk.

EXAMPLE 12

The charred disk obtained in Example 11 was further heated to 2500° C. to have the disk graphitized.

EXAMPLE 13

Pitch based carbon fibers (KUREKA CLOTH P-200 of Kureha Chemical Industry Co., Ltd.) were cut to an average length of 400 μm. Fifty five parts of the resulting short fibers were mixed uniformly with 45 parts of the same mesophase pitch as used in Example 11. Further, 10 parts of a graphite powder (≦10 μm) was added and the ingredients were mixed uniformly. The mixture was then heated, under agitation, to a temperature of 360° C. at a rate of 5° C./min so as to form a mesophase pitch coat on the surfaces of carbon fibers. Further, the mixture was subjected to a preliminary heat treatment by heating to 440° C. and holding at that temperature for 10 minutes. The thus prepared shaping sample was characterized as a uniform dispersion of mesophase pitch having a good binding property.

The shaping sample was hot pressed into a disk at a temperature of 500° C. and at a pressure of 1000 kg/cm$^2$; thereafter, it was heated to 1300° C. at atmospheric pressure and fired by holding at that temperature for 2 hours, whereby a charred disk measuring 60 mm in diameter and 10 mm thick was obtained.

EXAMPLE 14

The charred disk obtained in Example 13 was further heated to 2500° C. to have the disk graphitized.

EXAMPLE 15

Seventy-five parts of short (100 μm long) pitch based carbon fibers (Xylus GPMF 100J of the product of joint development by Kawasaki Steel Corp. and Nitto Boseki Co., Ltd.) was mixed uniformly with 25 parts of the same mesophase pitch as used in Example 7. The mixture was then agitated at 280° C. for 10 minutes so as to form a mesophase pitch coat on the surfaces of carbon fibers. Immediately thereafter (without preliminary heat treatment), the mixture was shaped into a disk at ambient temperature and at a pressure of 1000 kg/cm$^2$. The disk was heated to 1300° C. at a rate of 1° C./min at atmospheric pressure and held at that temperature for 2 hours, whereby a charred disk measuring 60 mm in diameter and 10 mm in thickness was obtained.

EXAMPLE 16

The charred disk obtained in Example 15 was further heated to 2500° C. to have the disk graphitized.

The firing temperatures used in Example 1-16 and the characteristics of the charred disks obtained in those Examples are shown in the following Table 1.

TABLE 1

| Example | Firing Temperature, °C. | Bulk density, g/cm$^3$ | Flexural strength, kgf/cm$^2$ |
| --- | --- | --- | --- |
| 1 | 1300 | 2.01 | 1360 |
| 2 | 2500 | 2.17 | 1510 |
| 3 | 1300 | 1.74 | 720 |
| 4 | 2500 | 1.88 | 870 |
| 5 | 1300 | 1.92 | 1100 |
| 6 | 2500 | 2.13 | 1250 |
| 7 | 1300 | 1.80 | 920 |
| 8 | 2500 | 1.89 | 1100 |
| 9 | 1300 | 1.85 | 1130 |
| 10 | 2500 | 1.98 | 1280 |
| 11 | 1300 | 1.83 | 980 |
| 12 | 2500 | 1.94 | 1180 |
| 13 | 1300 | 1.90 | 1210 |
| 14 | 2500 | 2.06 | 1320 |
| 15 | 1300 | 1.74 | 820 |
| 16 | 2500 | 1.83 | 910 |

What is claimed is:

1. A process for producing a carbon fiber reinforced carbon material, which process comprises the steps of:
    (a) impregnating a carbon fiber assembly with a melt of mesophase pitch that has a softening point of no higher than 350° C. and a viscosity of 80 poises at a temperature not higher than 400° C., and that can be carbonized in a yield of at least 70% when it is gradually heated to a temperature of about 600° C. in an inert gas atmosphere and then held at that temperature for two hours wherein said mesophase pitch contains almost 100% of an optical anistropic phase as examined under a polarizing microscope,
    (b) shaping the pitch-impregnated carbon fiber assembly, and
    (c) firing the shaped assembly at about 600°-1500° C. in a non-oxidizing atmosphere thereby obtaining the carbon fiber reinforced carbon material, which is optionally followed by graphitization at a temperature of about 2000°-3000° C.

2. A process for producing a carbon fiber reinforced carbon material, which process comprises the steps of:
    (a) mixing short carbon fibers with a mesophase pitch powder that has a softening point of no higher than 350° C. and a viscosity of 80 poises at a temperature not higher than 400° C., and that can be carbonized in a yield of at least 70% when it is gradually heated to a temperature of about 600° C. in an inert gas atmosphere and then held at that temperature for two hours wherein said mesophase pitch contains almost 100% of an optical anistropic phase as examined under a polarizing microscope,
    (b) heating the mixture thus obtained until said pitch melts or softens so that the surfaces of said short carbon fibers are perfectly covered with said pitch,
    (c) shaping the mixture under pressure within such a range that the structure of said short carbon fibers will not be destroyed nor will they lose their inherent strength, and
    (d) firing the shaped mixture at about 600°-1500° C. in a non-oxidizing atmosphere thereby obtaining the carbon fiber reinforced carbon material, which is optionally followed by graphitization at a temperature of about 2000°–3000° C.

3. A process according to claim 1 wherein a plurality of said assemblies are impregnated with a melt of said mesophase pitch and subjected to a preliminary heat treatment to prepare prepregs, which are then shaped together and fired.

4. A process according to claim 3 wherein the preliminary heat treatment is performed at a temperature of about 350°–490° C. in a non-oxidizing atmosphere.

5. A process according to claim 3 wherein the shaping step comprises laminating the prepregs together and pressing the laminate thus obtained at a temperature of about 300°–600° C. in a non-oxidizing atmosphere.

6. A process according to claim 2 wherein the short carbon fibers having their surfaces covered with the mesophase pitch from step (b) are subjected to a preliminary heat treatment at a temperature of about 300°–490° C. in a non-oxidizing atmosphere.

7. A process according to claim 2 wherein said mixture from step (a) comprises 30–90 wt % of carbon fibers and 70–10 wt % of mesophase pitch powder.

8. A process according to claim 2 or claim 7 wherein a carbonaceous aggregate powder is added to said mixture from step (a) in an amount of 3–70% of the weight of said mesophase pitch.

* * * * *